Patented Jan. 18, 1927.

1,615,089

UNITED STATES PATENT OFFICE.

FREDERIC HENRY LANG, OF RIVER FOREST, ILLINOIS, ASSIGNOR TO WESTERN ELECTRIC COMPANY, INCORPORATED, OF NEW YORK, N. Y., A CORPORATION OF NEW YORK.

FINISH REMOVER.

No Drawing.   Application filed August 31, 1922.   Serial No. 585,547.

This invention relates to improvements in finish removers.

An object of the invention is to provide a finish remover containing solvent materials of such character that the remover is, so to speak, "universal" in that it may be used to remove paints, lacquers, varnishes, shellacs, and enamels.

Another object of the invention is to provide a remover having the above characteristics and in addition, containing an ingredient which will form a film on the surface to be removed, the film serving to retard the evaporation of the solvents which are of a volatile nature.

A further object of the invention is to provide a "universal" finish remover which has no obnoxious odors.

A finish remover made in accordance with the present invention comprises a combination of volatile solvents and a gelatinizer which is dissolved by one of the solvents and serves to form a film which will retard the evaporation of the solvents. The gelatinizer and solvents used are of such character that the mixture has no obnoxious odors.

A suitable illustrative composition may comprise benzol 31⅔ per cent, wood alcohol 31⅔ per cent, ethyl acetate 31⅔ per cent, paraffin wax 5 per cent.

Another suitable illustrative composition may comprise benzol 31½ per cent, wood alcohol 31½ per cent, ethyl acetate 31½ per cent, paraffin wax 5 per cent and caustic soda one-half per cent. The caustic soda may be added when it is desired to accelerate the action of the remover.

While each of the solvents mentioned above may be used individually as removers for one or more of the finishes enumerated viz, paint, varnish, lacquer, shellac, and enamel, it is found that these three solvents in combination possess greater removing characteristics for these finishes than any one of the solvents used separately. The paraffin wax is dissolved by the benzol and serves as a gelatinizer, forming a film on the surface of the finish to be removed which retards the evaporation of the volatile solvents.

What is claimed is:

A finish remover comprising benzol 31½ per cent, wood alcohol 31½ per cent, ethyl acetate 31½ per cent, paraffin wax 5 per cent, and caustic soda one-half per cent.

In witness whereof, I hereunto subscribe my name this 26 day of August A. D., 1922.

FREDERIC HENRY LANG.